United States Patent
Amundsen et al.

(10) Patent No.: US 9,816,740 B1
(45) Date of Patent: Nov. 14, 2017

(54) HVAC/R SYSTEM REFRIGERANT AND OIL CONDITIONING, COMPOSITION, AND METHOD FOR REMOVING ACID AND MOISTURE THEREWITH

(71) Applicants: Ted J. Amundsen, Satellite Beach, FL (US); Vincent J. Storhaug, Melbourne, FL (US); Robert P. Scaringe, Rockledge, FL (US)

(72) Inventors: Ted J. Amundsen, Satellite Beach, FL (US); Vincent J. Storhaug, Melbourne, FL (US); Robert P. Scaringe, Rockledge, FL (US)

(73) Assignee: MAINSTREAM ENGINEERING CORPORATION, Rockledge, FL (US)

( * ) Notice: Subject to any disclaimer, the term of this patent is extended or adjusted under 35 U.S.C. 154(b) by 27 days.

(21) Appl. No.: 15/178,175

(22) Filed: Jun. 9, 2016

(51) Int. Cl.
*C09K 5/04* (2006.01)
*F25B 43/00* (2006.01)
*F25B 31/00* (2006.01)
*B01D 11/04* (2006.01)

(52) U.S. Cl.
CPC .......... *F25B 43/00* (2013.01); *B01D 11/0492* (2013.01); *C09K 5/041* (2013.01); *F25B 31/002* (2013.01)

(58) Field of Classification Search
CPC ..................................................... C09K 5/041
See application file for complete search history.

(56) References Cited

U.S. PATENT DOCUMENTS

| 5,395,544 A | * | 3/1995 | Hagihara | ............... | C09K 5/045 252/68 |
| 5,770,048 A | | 6/1998 | Scaringe et al. | | |
| 5,996,651 A | | 12/1999 | Scaringe et al. | | |
| 2014/0165625 A1 | | 6/2014 | Appler et al. | | |

OTHER PUBLICATIONS

United States Air Force Contract AF 33(616)-7006, Mar. 1961.

* cited by examiner

*Primary Examiner* — John Hardee

(57) ABSTRACT

A refrigerant and oil treatment composition for introduction into a vapor-compression system such as a refrigerator, heat pump, freezer, air conditioner, thermal control device, and refrigerant recovery apparatus has a composition alcohol and a drying agent. The drying agent is 2,2-dimethoxypropane which can react with moisture in the system to form an alcohol as a reaction product. The alcohol reaction product along with the composition alcohol separates any acid in the system from oil, refrigerant and hard surfaces of the system to form an acid-containing solvent composition. The quantity of the composition introduced into the system is based on the adsorption capacity of the filter-drier.

12 Claims, No Drawings

HVAC/R SYSTEM REFRIGERANT AND OIL CONDITIONING, COMPOSITION, AND METHOD FOR REMOVING ACID AND MOISTURE THEREWITH

CROSS-REFERENCE TO RELATED APPLICATION

In general, acid and moisture are undesirable in any vapor-compression air conditioning, refrigeration or heat pump systems and the like (hereafter referred to as a HVAC/R system) due to corrosion and deleterious side reactions with system additives.

BACKGROUND OF THE INVENTION

Making matters worse, polyolester (POE) oils are commonly used in modern HVAC/R systems operating with hydrofluorocarbon refrigerants, replacing mineral oils which were commonly used with chlorinated refrigerants. POE is formed by polymerization reactions between alcohols and carboxylic acids, and is susceptible to hydrolysis in the presence of water. Water can react with synthetic oils such as POE, PVE and PAG to form unwanted chemical reaction products including acids. In the case of POE oil, water will break the ester bonds to form organic acids and alcohols. These organic acids have been implicated in corrosion and sludge formation in HVAC/R systems.

Moisture can enter the refrigeration system through improper evacuation procedures or by the service technician or manufacturer inadvertently introducing oil that is saturated with moisture due to extended exposure of the oil to the ambient air (which usually contains very high levels of moisture relative to the limits in a refrigeration system).

Despite all attempts to keep the HVAC/R system as dry as possible, moisture can still enter the system and be absorbed into the oil. Although POE oil is hygroscopic and will readily absorb moisture upon exposure, even mineral oils can absorb moisture albeit their saturated moisture levels being much lower about 25 Parts Per Million (PPM) for mineral oil compared to 2,500 for POE oil, 6,500 for PVE oil and 10,000 PPM for PAG oil. Even with mineral oil's much lower saturation moisture levels, however, it is not always desirable to change out the oil and the refrigerant in the event of moisture or acid contamination.

While the common filter-drier used in a typical vapor compression system will remove acid and moisture from the HVAC/R system (as long as its absorption capacity has not been reached) the filter-drier is typically placed in the liquid line or occasionally also in the vapor line. Therefore, a filter can only remove some portion of the acid and moisture that passes through the filter-drier, the acid and moisture being carried along with the refrigerant and oil mixture. The majority of the acid and moisture will, however, still reside in the oil. The moisture will remain in the oil until the oil is saturated with water, which can mean a significant amount of moisture being present in the case of synthetic lubricants or oils. The acid tends to be dissolved in that trapped moisture. As above noted, mineral oil becomes saturated with moisture at 25 PPM; however, the synthetic oils have saturations limits that are at least 2,500 PPM. Since most of the refrigerant and oil mixture flowing through the liquid or vapor lines is refrigerant with the oil concentration being only a few percent, the filter-drier is ineffective at removing the acid and moisture from the majority of the oil that remains in the oil sump of the compressor, or that remains trapped on any surfaces, before the acid and moisture in the system has had sufficient time to react and create problems in the system that lead to the destruction of the HVAC/R unit.

U.S. Pat. No. 5,770,048 teaches the introduction of an alcohol-containing composition into an HVAC/R system to accelerate the separation of the acid composition from the system and thereby speed the delivery of the acid to the filter drier where it is removed. This formulation unfortunately had no effect on removing moisture trapped in the system and accelerating its removal. We have now developed a chemical approach to remove the moisture as well as the acid, thereby dramatically improving upon the formulation taught in U.S. Pat. No. 5,770,048. In particular, we have discovered that the novel combination of known acid removal compound with our moisture removal composition does not form any unwanted byproducts, with each compound operating without damaging the efficacy of the other.

Therefore, it is highly advantageous to be able to remove acid and moisture quickly from the refrigerant and the oil without interrupting the operation of the HVAC/R system. Additionally, it is desirable to have a way of protecting against future moisture contamination.

One way to remove moisture from an HVAC/R system is by the introduction of a chemical additive to the system that consumes water via a chemical reaction. U.S. Patent Application No. 2014/0165625 A1 teaches the use of hydrolytic orthoesters drying agents which are introduced into an operating HVAC/R system. Orthoesters are specifically emphasized as hydrolytic moisture scavenging additives and only broadly suggests the use of hydrolytic drying agents (e.g. acetals, epoxides and carbodiimides). While orthoesters, specifically orthoformates, remove water from refrigeration oils, they can react to form an ester and an alcohol, which in and of itself would be acceptable; however, esters can then be hydrolyzed further to form acid (e.g. formic acid) under certain conditions which is highly undesirable in HVAC/R system. Therefore, an improved moisture removal additive is desperately needed for HVAC/R systems that would not potentially hydrolyze to form acids since acids are responsible for corrosion, compressor burn-outs and continued oil/refrigerant degradation.

It is also well known in the art to use silanes as moisture scavengers, however the use of silanes can interfere with the action of silane-based leak sealing additives and therefore are not optimal. That is, the silanes used for moisture removal are selected to form soluble polymers that stay dissolved in the oil whereas silanes used to seal leaks are designed to form highly cross-linked insoluble polymers at the leak site. The moisture removing silanes could thus prevent cross-linking of the leak sealing chemicals and reduce their effectiveness.

To resolve the problem of undesired by-products of the moisture drying reaction, we discovered that a drying formulation for removing moisture from the refrigerant and oil in an operating HVAC/R systems. The drying agent capitalizes on the hydrolysis of 2,2-dimethoxypropane to remove the moisture from the refrigerant and oil by consuming the water molecules and advantageously producing methanol as well as producing acetone which does react any further in the HVAC/R system. This prevents the problem that occurs when using orthoformates, namely the buildup of acid due to over-hydrolysis of orthoformates that are used in HVAC/R drying formulas such as the above-referenced U.S. Patent Application No. 2014/0165625 A1.

As stated earlier, while U.S. Patent Application No. 2014/0165625 A1 broadly suggests the use of hydrolytic drying agents including acetals, and although 2,2-dimethoxypropane is also known as acetone dimethyl acetal, the prior art appears not to have recognized, as we did, that it is a far superior drying agent that will not form unwanted harmful reaction products. Furthermore, the prior art appears not to have realized that this compounds reaction with the water molecules produces methanol which will liberate the trapped acid from the oil allowing it to vaporize and travel to the filter drier, thereby accelerating the removal of acid from the system. We have found that United States Air Force Contract AF 33(616)-7006 taught the use of 2,2-dimethoxypropane, anhydrous hydrazine, trimethyl orthoacetate, trimethyl orthoformate, trimethyl orthovalerate as well as two silanes only to prevent fuel filter icing in mineral-oil based aviation fuels. However, this document provides no guidance for use of 2,2-dimethoxypropane in HVAC/R systems nor suggests their superiority by not further hydrolyzing to acid, as is possible with orthoesters.

DETAILED DESCRIPTION OF THE INVENTION

We have discovered that 2,2-dimethoxypropane and if desired additional alcohol can be used to effective and rapidly remove moisture and acid from the HVAC/R system, whereby the moisture is reacted and the acid is liberated from the system, including the oil and hard surfaces, by the methanol produced from the reaction and any additional alcohol that has been added thus allowing the liberated acid to flow into the filter drier where it is removed. We have found that the alcohol can be ethanol, methanol, or isopropanol.

The preferred embodiment of the formulation is a mixture that is about 1% to 100% by weight 2,2-dimethoxypropane combined with about 0% to 99% weight percent ethanol thereby removing the moisture from the refrigerant and oil by consuming the water molecules and producing methanol and acetone and the methanol produced along with added ethanol liberates the trapped acid from the system (including hard surfaces, refrigerant and oil lubricant) allowing the alcohol and acid to be adsorbed in the filter-drier. This formulation effectively works with all refrigerants and lubricants including CFC, HCFC, HFC, and HFO refrigerants and both mineral and synthetic lubricants.

The alcohol and drying agent formulation is best added to the oil sump of the compressor since the majority of the acid and moisture are in the oil and the oil sump represents the largest accumulation of oil anywhere in the system. The currently preferred embodiment to introduce the formulation to the oil sump is to introduce it into the low-pressure side of a system, via an existing service port since this will lead directly to the oil sump of the compressor.

The pressure differential between the low pressure side and high pressure side of an operating system can be used to push the alcohol and drying agent formulation additive into the system using an apparatus described in U.S. Pat. No. 5,996,651.

Instead of using the pressure difference to push the drying agent formulation additive into the low pressure side of an operating system, it is well known in the art to use a pressurized container that is filled with the alcohol and drying agent formulation and then pressurized with the refrigerant of the system, or one of the refrigerants of the system, if the refrigerant is a blend of refrigerants, and use the higher pressure in the container at ambient temperature conditions to push the additive into the low pressure side of the operating system.

Alternatively, the drying agent formulation additive can be introduced into the system by the method described in pending U.S. patent application Ser. No. 14/959,395, filed Dec. 4, 2015 and titled "System and Method Introducing Liquid Additive into a Vapor Compression System via a Pressurized Can and Optionally for Purging a Connecting Hose". In this method of additive introduction, the liquid additive is packaged in a vessel, like an aerosol can. A gas is then added to the vessel also during the vessel filling process and the vessel is pressurized to near but above atmospheric pressure and always to a pressure below a design operational low-side pressure of the system where the additive will be eventually introduced. To introduce the additive into a vapor compression system, the vessel that contains the liquid additive is connected to a low-side service port of the system. In a first or upright position of the vessel, with the system compressor not operating, and just prior to making the final connection to the system at the low-side service port, the gas in the vessel is used to purge the line connecting the vessel to the low-side service port, until the pressure in the vessel is at atmospheric pressure, then the final connection is completed and the vessel is re-pressurized by the low-pressure of the system, until the pressures in the vessel and the system are equalized. Thereafter, in a second or inverted position of the vessel, with the system compressor now operational, the liquid additive is drawn into the system. Then with the system compressor again not in operation and the vessel returned to the first position, any liquid additive that has not been introduced into the system lines and remains in a connecting hose is flushed back into the vessel.

While we have shown and described a currently preferred embodiment in accordance with our invention, it should be understood that the same is susceptible of further changes and modifications without departing from the scope of our invention. We, therefore, do not intend to be limited to the details shown and described herein but intend to cover all such changes and modifications that are encompassed by the attached claims.

We claim:

1. A vapor compression system, comprising a filter-drier, and a composition of alcohol selected from the group consisting of ethanol, methanol, isopropanol and mixtures thereof and a drying agent consisting of 2,2-dimethoxypropane, wherein the drying agent is reactable with moisture in the system to form an alcohol as at least one reaction product so that acid in the system is separated from oil, refrigerant and hard surfaces of the system to form an acid-containing solvent product that is removed from the system by the filter-drier.

2. The system of claim 1, wherein a quantity of the composition in the system is based on the adsorption capacity of the filter-drier.

3. A method of removing acid and moisture in a vapor-compression system, comprising introducing a composition having alcohol selected from the group consisting of ethanol, methanol, isopropanol and mixtures thereof and a drying agent consisting of 2,2-dimethoxypropane into the system, wherein the drying agent can react with the moisture in the system to form at least one reaction product as an alcohol, and using the formed alcohol and the composition alcohol to separate the acid from the oil.

4. The method of claim 3, wherein the introduction of the composition occurs at a low-pressure side of the system during operation by a pressure differential between high and low pressure sides of the system.

5. The method of claim 3, wherein a low-pressure service port comprises a connection to the low pressure side and a high-pressure service port is the connection to the high pressure side.

6. The method of claim 3, wherein the acid-containing solvent composition is removed by passing the vaporized solvent through a filter-drier of the system.

7. The method of claim 3, wherein the system is one of a refrigerator, a heat pump, a freezer, an air conditioner, a thermal control device, a refrigerant recovery apparatus, a refrigerant recycling apparatus and a refrigerant reclamation apparatus.

8. The method of claim 3, wherein the drying agent is present in a concentration between about 1 and 99 percent by mass.

9. The method of claim 3, wherein the alcohol proportion of the composition is present in a concentration between 1 and 99 percent by mass.

10. The method of claim 3, wherein a high viscosity liquid or viscosity modifier is added to match a viscosity of lubricating oil in the system.

11. The method according to claim 3, wherein introducing the composition comprises providing a quantity of the composition based on an adsorption capacity of filter-drier associated with the system.

12. The method according to claim 3 wherein the introduction of the composition is into a compressor oil sump of the system.

\* \* \* \* \*